United States Patent
Drummond et al.

(10) Patent No.: US 8,462,525 B2
(45) Date of Patent: Jun. 11, 2013

(54) WIDE RANGE DC POWER SUPPLY WITH BYPASSED MULTIPLIER CIRCUITS

(75) Inventors: Geoffrey N. Drummond, Ft. Collins, CO (US); Bryce L. Hesterman, Ft. Collins, CO (US)

(73) Assignee: Colorado Power Electronics, Inc., Fort Collins, CO (US)

( * ) Notice: Subject to any disclaimer, the term of this patent is extended or adjusted under 35 U.S.C. 154(b) by 776 days.

(21) Appl. No.: 12/586,985

(22) Filed: Sep. 30, 2009

(65) Prior Publication Data

US 2011/0075445 A1     Mar. 31, 2011

(51) Int. Cl.
*H02M 7/25* (2006.01)

(52) U.S. Cl.
USPC ............................................... 363/60

(58) Field of Classification Search
USPC .................... 363/13, 15, 17, 60; 323/267
See application file for complete search history.

(56) References Cited

U.S. PATENT DOCUMENTS

| | | | |
|---|---|---|---|
| 3,381,204 A | 4/1968 | Cox | 321/15 |
| 4,199,805 A * | 4/1980 | Martinelli et al. | 363/60 |
| 4,994,953 A | 2/1991 | Haak | 363/71 |
| 6,697,265 B2 | 2/2004 | Drummond et al. | 363/17 |
| 7,477,042 B2 | 1/2009 | Wiseman | 322/28 |
| 7,495,938 B2 * | 2/2009 | Wu et al. | 363/40 |

\* cited by examiner

*Primary Examiner* — Adolf Berhane
*Assistant Examiner* — Yemane Mehari
(74) *Attorney, Agent, or Firm* — William E. Hein (57) ABSTRACT

A power supply provides dc power over a wide range of output voltages at full operating power by utilizing multiplying circuits (200) supplied by a source of high-frequency alternating current (90). The multiplier circuits include a plurality of multiplier cells containing at least two diodes (207, 209) and a driving capacitor (208). The multiplier cells are shunted by bypass rectifiers (205, 206) arranged such that currents are allowed to flow from multiplier input terminals to power supply output terminals. The bypass rectifiers do not conduct current for low output current levels, but conduct increasing levels of current when output currents increase beyond a conduction threshold value, thereby increasing the maximum available output current. Interactions among the diodes and capacitors in the multiplier circuits cause the amplitudes of the multiplier input currents to remain relatively constant as the output voltage is varied while operating at full power.

7 Claims, 6 Drawing Sheets

WIDE RANGE DC POWER SUPPLY WITH BYPASSED MULTIPLIER CIRCUITS

BACKGROUND AND SUMMARY OF THE INVENTION

This invention relates to high voltage power supplies such as those used in plasma sputtering, space electric propulsion, lasers and X-ray machines, as well as to power supplies that have a wide full-power operating range that allows them to provide high current at low output voltages and low current at high output voltages.

U.S. Pat. No. 6,697,265 teaches multiphase L-C-C resonant power supplies for plasma sputtering applications having a wide full-power output voltage range. These power supplies have capacitors in parallel with output rectifier diodes, with at least two diode-capacitor combinations connected in series between the output voltage terminals. The output rectifier circuit shown in FIG. 5 of that patent can produce a maximum dc voltage of twice the peak value of the rectifier ac input voltage. The voltage for the output rectifier is typically supplied from a transformer. In high-voltage power supplies, it can be advantageous to reduce the voltage that the transformer is required to provide by using diode-capacitor multiplier circuits such as Cockcroft-Walton multipliers to increase the ratio of the dc output voltage to the ac voltage supplied by the transformer. The rectifier circuit of FIG. 5 of U.S. Pat. No. 6,697,265 also requires an output inductor to reduce ripple and increase the full-power output voltage range. Inductors have significant mass, and removing them is particularly advantageous for space applications. The output rectifier circuit shown in FIG. 7 of that patent does not require an output inductor, but the peak dc output voltage is only 1.15 times the peak ac input voltage of the rectifier.

U.S. Pat. No. 4,994,953 teaches the use of voltage multipliers to rectify the output voltage of three-phase inverters for space applications, but the output current of voltage multipliers is limited by the driving capacitors that supply the ac current to the rectifier diodes. This current limiting effect is described in U.S. Pat. No. 3,381,204 in terms of a capacitor reactance voltage drop. The output current limitation prevents the power supply from operating over a wide full-power operating voltage range unless impractically large driving capacitors were used.

U.S. Pat. No. 7,477,042 utilizes a set of three voltage multipliers identical to the teachings of U.S. Pat. No. 4,994,953, but it explicitly describes a string of filter capacitors that is shared among the three voltage multipliers. Significant energy is stored in this string of filter capacitors. Plasma loads such as those used in sputtering and electric propulsion can develop low impedance arcs that are detrimental if too much energy is dumped into them. Consequently, power supplies with low stored energy are preferred. The common string of filter capacitors described in these prior art patents can have less capacitance than three separate voltage multipliers with three separate filter capacitor strings due to the reduction of currents flowing in the filter capacitor string at common nodes when the currents from the three phases are combined. What was not recognized in the prior art, however, was that the common string of filter capacitors may be entirely removed, thereby further reducing the stored energy.

The use of multiple switching power supplies with staggered switching phases for powering Hall effect thrusters for electric propulsion is described in Button, R. M. et al, "Digital control technologies for modular DC-DC converters," IEEE 2000 Aerospace Conference Proceedings, Volume 5, 18-25 Mar. 2000 pp. 355-362. However, the converters described in this reference utilize filter inductors that add to the mass.

F. Belloni et al., "Parameters Optimization for Improved Dynamics of Voltage Multipliers for Space," IEEE PESC 2004, pp. 439-433 teaches that the driving capacitors in voltage multipliers may have values that are progressively reduced in successive stages in order to decrease the output impedance and improve the transient response, but staggering the capacitance values in a multiplier circuit to widen the full-power operating range is not discussed.

The dc power supply of the present invention provides dc power over a wide range of output voltages at full operating power by utilizing multiplier circuits supplied by a source of high-frequency alternating current. These multiplier circuits include a plurality of multiplier cells, each containing series-connected diodes and a driving capacitor. The multiplier cells are shunted by bypass rectifiers that are arranged to allow current to flow from multiplier input terminals to output terminals of the power supply. The bypass rectifiers do not conduct current for low output current levels, but conduct increasing levels of current when output currents increase beyond a conduction threshold value, thereby increasing the maximum available output current. The multiplier driving capacitors exhibit significant ripple voltages at moderate output currents, and may be completely discharged each cycle at higher output currents. Interactions among the diodes and capacitors in the multiplier circuits cause the amplitude of the alternating currents delivered by the source of high-frequency alternating current to the Multiplier input terminals to remain relatively constant as the output voltage is varied over a wide range while operating at full power. This allows the efficiency of the power supply to remain high over a wide range of output voltages.

DETAILED DESCRIPTION OF THE PREFERRED EMBODIMENTS

Figure 1:
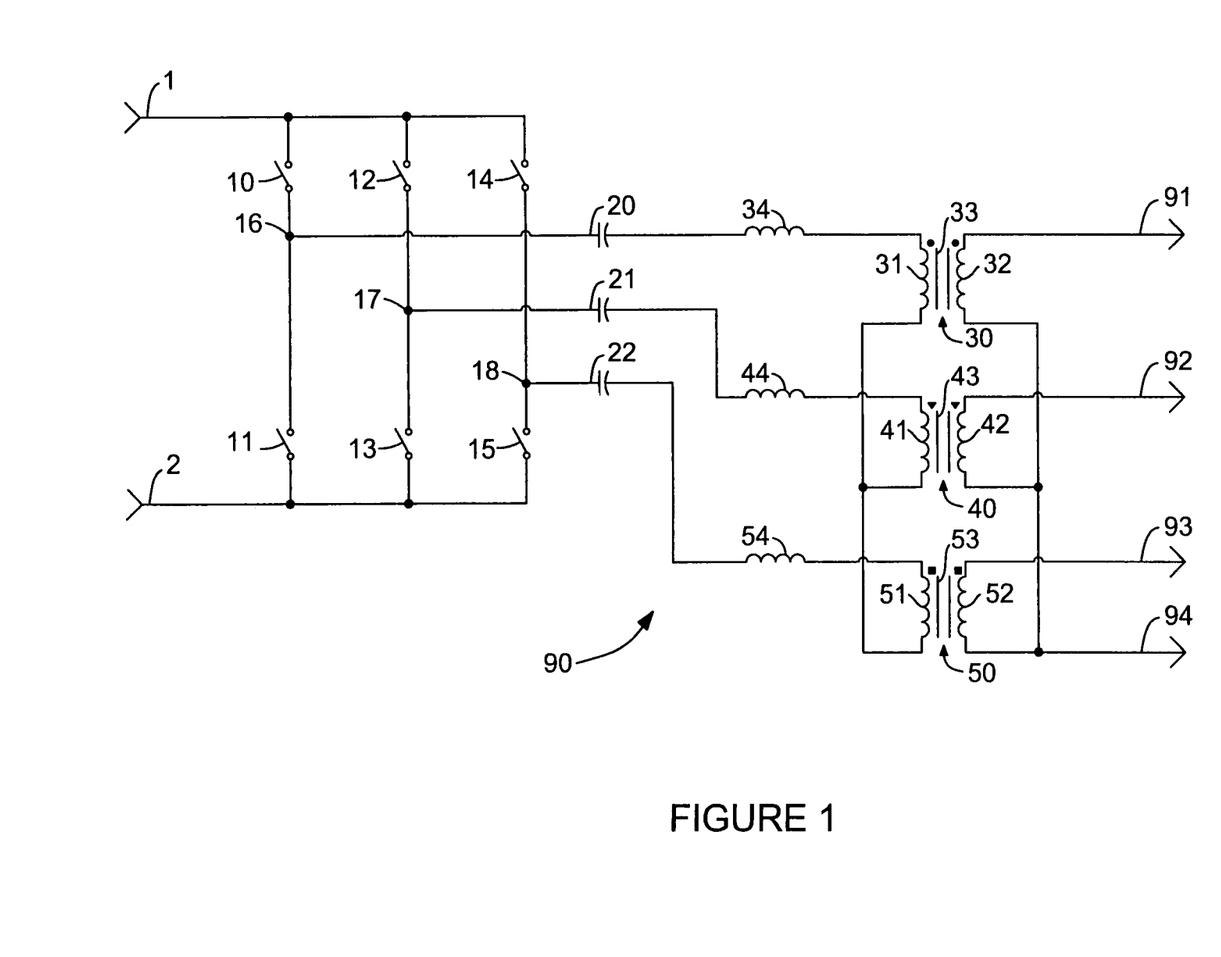
FIG. 1 illustrates a prior art three-phase resonant inverter circuit with wye-connected transformers.

Referring to FIG. 1, there is shown a prior art three-phase resonant inverter 90 that is representative of one of the many types of inverters that may be employed to provide a source of high-frequency alternating current for use by the power supplies of the present invention. Three-phase resonant inverter 90 receives a conventional source of dc power at input terminals 1 and 2, and provides three phases of square wave voltages at switching output terminals 16, 17, 18 through the actions of switching devices 10-15 which are connected to form a three-phase switching bridge. Each of the switching devices 10-15 includes a conventional electronic switch such as a transistor, and may also include a conventional freewheeling diode, connected in an anti-parallel manner, and a blocking diode in series with the electronic switch. The switching devices 10-15 are operated by a conventional switching controller that is not shown. The controller operates the switches at frequencies that are considerably higher than frequencies employed in ac power distribution, and typically range from several kHz to hundreds of kHz and beyond, depending on the practical operating frequency range of the switching devices.

Switching output terminals 16-18 are coupled to a magnetic assembly consisting of transformers 30, 40, 50 and series inductances 34, 44, 54 through series-connected capacitors 20-22. Series inductances 34, 44, 54 may be implemented as discrete inductors, or they may consist of the leakage inductances of the transformers 30, 40, 50. Transformer secondary windings 32, 42, 52 are connected in a wye arrangement, with inverter output terminals 91-93 and a common terminal 94.

Figure 2:
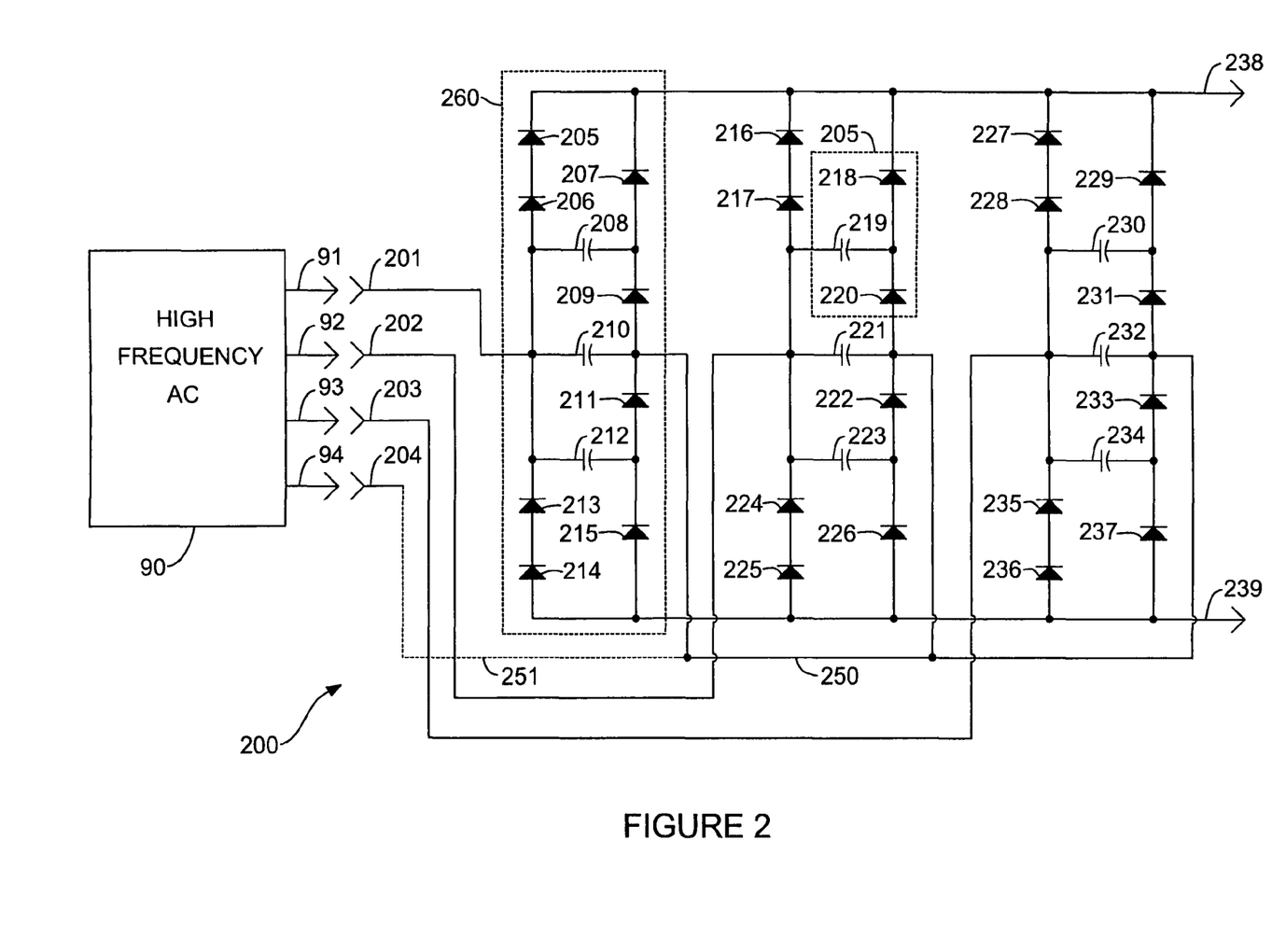
FIG. 2 illustrates a three-phase multiplying circuit having one positive stage and one negative stage, in accordance with the present invention.
Figure 3:
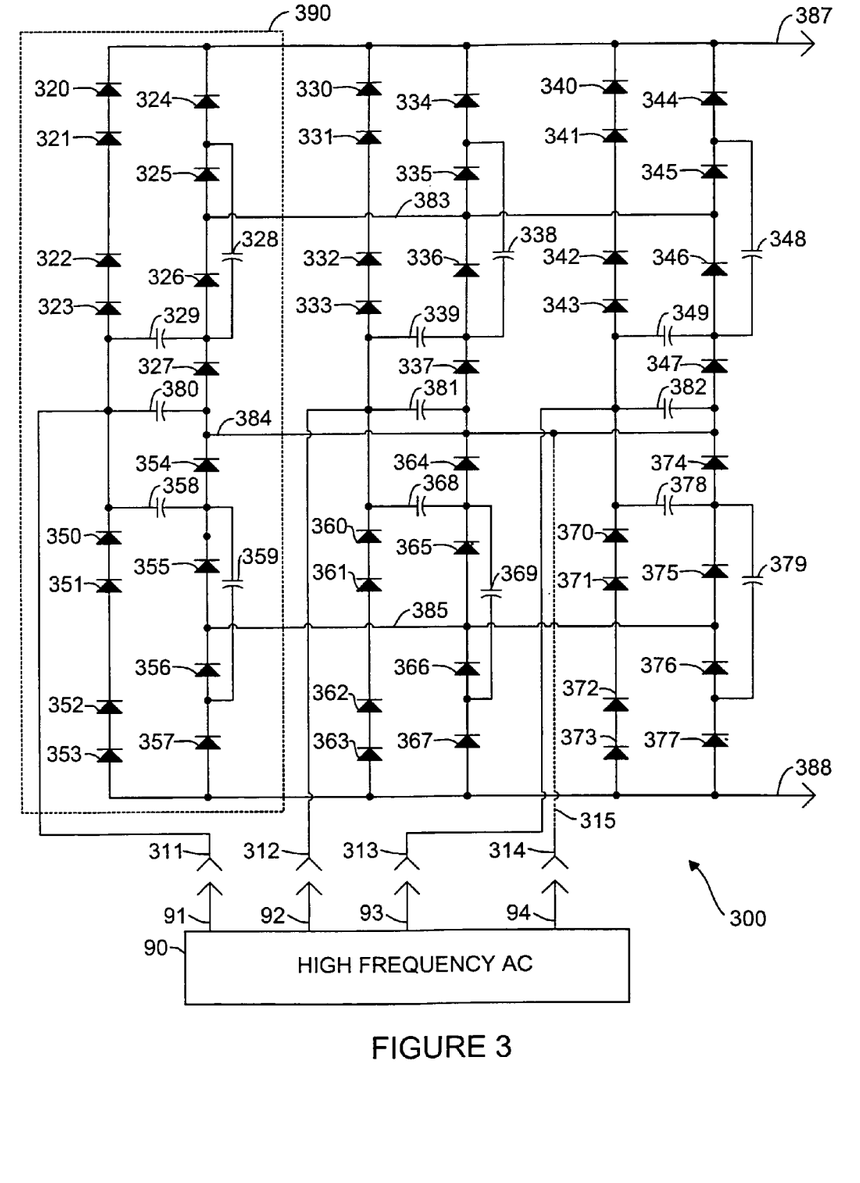
FIG. 3 illustrates a three-phase multiplying circuit having two positive stages and two negative stages, in accordance with the present invention.

Although the voltages provided at switching output terminals 16-18 are square waves, the currents flowing through those terminals are nearly sinusoidal due to series-resonant interactions between series-connected capacitors 20-22 and series inductances 34, 44, 54, as well as the parallel-resonant interactions between series inductances 34, 44, 54 and the effective input capacitances in voltage multiplier circuits of the present invention, such as those shown in FIGS. 2 and 3.

Any known type of inverter may be employed to provide an ac source for the power supplies of the present invention. The number of phases in the switching bridge may be increased, and may also be reduced from three to two or even one, but reducing the number of phases increases the ripple in the output voltage of the power supply. The switching bridge could also be a multi-level bridge instead of the two-level bridge that is shown. The transformer primary windings are shown connected in a wye arrangement, but they could also be connected in a delta arrangement. In the case of a delta arrangement, capacitors 21, 22 may remain in the positions shown in FIG. 1 or they may be inserted inside the delta as is done with the inverter illustrated in FIG. 4. Similarly, transformer secondary windings 32, 42, 52 could also be connected in a delta arrangement if a common terminal is not desired. If isolation is not required, then transformers 33, 43, 53 may be omitted, with inductances 34, 44, 54 being implemented as discrete inductors.

Referring now to FIG. 2, there is shown a three-phase multiplying circuit 200 utilizing three branch multiplier circuits that receive power from a source of high-frequency ac power 90 through multiplier input terminals 201-204. High frequency ac power source 90 may be implemented with a resonant inverter such as the one shown in FIG. 1. Inverter output terminal 94 is the common terminal when secondary windings 32, 42, 52 are connected in a three phase wye, and it is optionally connected with a multiplier common terminal 250 through an optional connection 251 to multiplier input terminal 204. Connection 251 is optional because very little current flows through it under normal operating conditions. A three-phase multiplying circuit 200 converts the ac input voltages between the input terminals 201-204 to a dc output voltage that is developed between a positive output terminal 238 and a negative output terminal 239 for supplying a dc output current to an external load.

Parallel capacitors 210, 221, 232 are each connected between a multiplier input terminal 201-203, respectively, and multiplier common terminal 250. A multiplier cell 205 consists of a driving capacitor 219 connected to multiplier diodes 218 and 220. Branch multiplier circuit 260 includes two voltage multiplier cells. Multiplier diodes 207, 209 and driving capacitor 208 form a voltage multiplier cell that produces a voltage between multiplier common terminal 250 and positive output terminal 238 as driving capacitor 208 is charged and discharged by the ac voltage across parallel capacitor 210. Similarly, multiplier diodes 211, 215 and driving capacitor 212 form a voltage multiplier cell that produces a voltage between multiplier common terminal 250 and negative output terminal 239 as driving capacitor 212 is charged and discharged by the voltage across parallel capacitor 210. The other two branch multiplier circuits shown in FIG. 2 also utilize voltage multiplier cells that are connected between multiplier common terminal 250 and dc output terminals 238 and 239, with the driving capacitors being charged and discharged by the ac voltages across parallel capacitors 221 and 232. The multiplier diodes are shown as single diodes, but could be implemented using an array of diodes connected in a series-parallel arrangement to achieve a desired voltage and current capability.

Each voltage multiplier cell of FIG. 2 is shunted by a bypass rectifier consisting of one or more diodes connected between an ac input terminal and a dc output terminal. For example, the multiplier cell consisting of multiplier diodes 207, 209 and driving capacitor 208 is bypassed by a bypass rectifier consisting of diodes 205, 206. The bypass rectifiers are shown as two diodes connected in series because they need to have a breakdown voltage that is greater than the breakdown voltage of the multiplier diodes. At low output currents, the bypass diodes do not conduct current, but they conduct most of the delivered output current when the output current is high. Prior art power supplies with voltage multipliers do not utilize bypass rectifiers, and, consequently, the output current of those power supplies is limited by the impedance of the driving capacitors.

When high frequency ac power source 90 is implemented with a resonant inverter such as the one shown in FIG. 1, ac currents flowing through multiplier input terminals 201-203 of FIG. 2 are nearly sinusoidal with relatively low levels of harmonic currents. The three ac voltages between the three multiplier input terminals 201-203 are relatively sinusoidal at light loads, but become increasingly clipped as the dc output current increases. Because power is only transmitted due to currents and voltages at the same frequency, little power is transmitted in the harmonic currents and voltages due to the relatively low levels of harmonic currents. Consequently, the operation of inverter 90 and multiplier circuit 200 connected together may be described with high accuracy by only considering the fundamental components of the voltages and currents flowing into the multiplier circuit. During circuit analysis, the impedance between the input terminals of the multiplier circuit 200 may be considered to be an effective input resistance in parallel with an effective input capacitance.

The effective input capacitance between input terminals 201-203 of multiplier circuit 200 is a function of the capacitance of the parallel capacitors, the capacitance of the driving capacitors and the output current. The effective input capacitances function as parallel resonant capacitors in combination with the series inductances of the inverter 90. The effective input capacitance increases as the output current increases, but the effect is not linear. The effective input capacitance can be expressed as the product of the capacitance of one of the parallel capacitors and a conversion factor $k_c$ that ranges from $\frac{1}{3}$ at low output currents to about 2 at high output currents.

Similarly, the effective input resistance can be expressed as the product of the load resistance and a conversion factor $k_r$ that ranges from about ⅓ at low output currents (high load resistances) to about 2 at high output currents (low load resistances). The fact that conversion factors $k_c$ and $k_r$ change inversely with respect to the load resistance produces a beneficial effect whereby, when operating at full output power, the amplitudes of the ac input currents flowing into multiplier input terminals 201-203 of multiplier circuit 200 remain fairly constant as the output voltage is varied. Consequently, when operating at full output power, the amplitudes of the currents flowing through the transformers and switches remain fairly constant over a wide range of input and output voltages. This effect is analogous to a continuously-variable automatic transmission, and allows the power supply to operate at high efficiencies over a wide range of input and output voltages.

The changes in the conversion factors are due to interactions between the capacitors and the diodes in the multiplier circuits that shift as the output current is varied. For example, at low output currents, the effective multiplier input capacitance is mainly due to the parallel capacitors. As the output current is increased, an increasingly large ripple voltage is developed across the driving capacitors until the driving capacitors are completely discharged each cycle at sufficiently high output currents. This has the effect of increasing the effective multiplier input capacitance as the output current increases. In contrast, the driving capacitors in prior-art multiplier circuits are typically sized so that the ripple voltage is a relatively small percentage of the dc voltage across them.

It appears that the widest full-power operating range is achieved when the driving capacitors have a capacitance value of about ⅘ the value of the parallel capacitors, but that may not always be the optimum ratio.

The multiplying circuits of the present invention store relatively little output energy, and this makes them suitable for supplying power to a variety of plasma applications where having low stored energy is important.

The output power supplied by power supplies that include a resonant inverter circuit that provides high-frequency alternating current to a multiplier circuit can be regulated by adjusting the operating frequency of the inverter, but could also be controlled by adjusting duty cycles of inverter switches, by using resonant components with adjustable values or by using switching devices to connect or disconnect resonant components.

Referring now to FIG. 3, there is shown a three-phase multiplying circuit 300 having three branch multiplier circuits, each of which has two positive stages and two negative stages as illustrated by a branch multiplier circuit 390. Corresponding stages of the branch multiplier circuits are coupled to each other at intermediate terminals. Multiplying circuit 300 receives power from a conventional source of high-frequency ac power such as inverter 90 through multiplier input terminals 311-314, and develops a dc output voltage between a positive output terminal 387 and a negative output terminal 388 for supplying a dc output current to an external load. Three-phase multiplying circuit 300 is capable of producing about three times the output voltage as that of three-phase multiplying circuit 200 of FIG. 2 from equivalent input voltages. An optional connection 315 connects multiplier input terminal 314 with a multiplier common terminal 384.

The first positive stages in each branch rectifier are connected between a multiplier common terminal 384 and a positive intermediate terminal 383. The second positive stages are connected between positive intermediate terminal 383 and positive output terminal 387. The first negative stages are connected between multiplier common terminal 384 and a negative intermediate terminal 385. The second negative stages are connected between negative intermediate terminal 385 and negative output terminal 388.

Each of the stages in each branch multiplier of FIG. 3 includes at least one voltage multiplier cell. For example, a first branch multiplier has a first positive stage with a multiplier cell having multiplier diodes 326, 327 and a driving capacitor 329. This cell produces a voltage between multiplier common terminal 384 and positive intermediate terminal 383 as driving capacitor 329 is charged and discharged by the ac voltage across parallel capacitor 380. Similarly, multiplier diodes 354, 355 and driving capacitor 358 form a voltage multiplier cell in the first negative stage that produces a voltage between multiplier common terminal 384 and negative intermediate multiplier common terminal 385 as driving capacitor 358 is charged and discharged by the voltage across parallel capacitor 380.

The second positive multiplier stages of FIG. 3 utilize driving capacitors 328, 338, 348 that are respectively connected in series with driving capacitors 329, 339, 349 just as the driving capacitors are connected in series in conventional Cockcroft-Walton voltage multipliers. The driving capacitors in the two negative stages are connected in the same manner. The driving capacitors in each stage after the first stage preferably have capacitance values that are smaller than those of the preceding stage.

A bypass rectifier composed of one or more diodes is connected between each of the multiplier input terminals 311-314 and a dc output terminal of FIG. 3. For example, diodes 320-323 are connected between multiplier input terminal 311 and positive output terminal 387.

Parallel capacitors 380-382 of FIG. 3 are each connected respectively between multiplier input terminals 311-313 and multiplier common terminal 384. These capacitors provide the same function as parallel capacitors 210, 221, 232 of FIG. 1.

The multiplier diodes of FIG. 3, like those of FIG. 2, are shown as single diodes, but could be implemented using an array of diodes connected in a series-parallel arrangement to achieve the desired voltage and current capability. The bypass rectifiers are shown with four diodes connected in series because they need to have a breakdown voltage that is about four times greater than the breakdown voltage of the multiplier diodes.

Three-phase multiplying circuit 300 of FIG. 3 stores less output energy than similar multipliers employed in prior-art converters because a common filter capacitor string is not used. This configuration renders multiplier circuit 300 especially suitable for a variety of plasma applications in which low stored energy is important.

Figure 4:
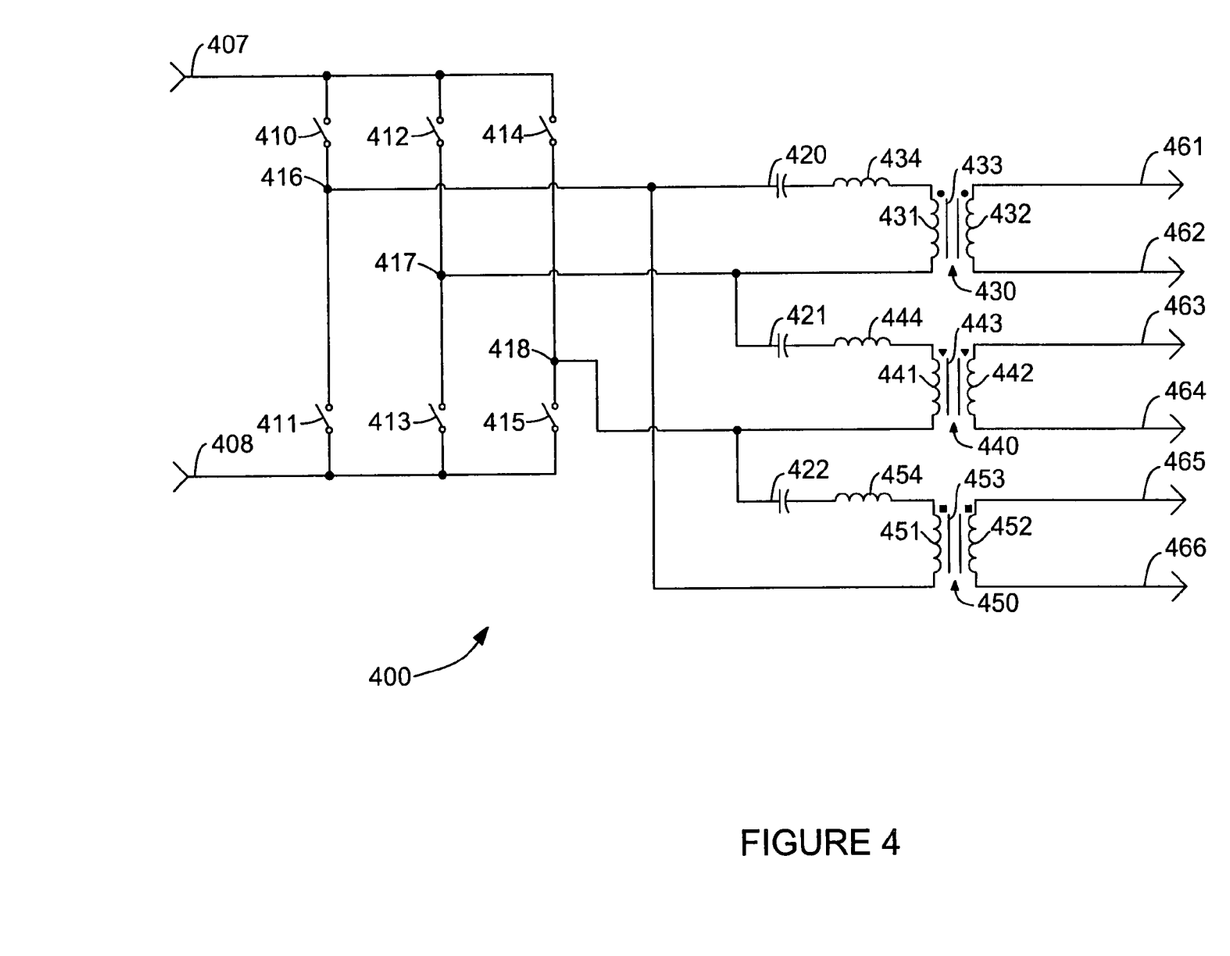
FIG. 4 illustrates a three-phase resonant inverter circuit having a delta-connected primary circuit and floating secondary windings, in accordance with the present invention.

Referring now to FIG. 4, there is shown a three-phase resonant inverter 400 in accordance with the present invention that may be employed to create a multi-phase source of high frequency alternating current. Unlike three-phase resonant inverter 90 illustrated in FIG. 1, three-phase resonant inverter 400 provides three floating secondary windings, and is suitable for driving three-phase multiplier circuits such as those illustrated in FIGS. 5 and 6. It can be controlled in the same ways as described above regarding three-phase resonant inverter 90.

Three-phase resonant inverter 400 receives dc power from an external source at input terminals 407 and 408, and provides three phases of square wave voltages at switching output terminals 416-418 through the operation of switching devices 410-415 connected to form a three-phase switching bridge. Each switching device 410-415 includes an electronic switch such as a transistor, and may also include a freewheeling diode, connected in an anti-parallel manner, and a blocking diode in series with the electronic switch. The switching devices 410-415 are operated by an external conventional switching controller.

Series capacitors 420-422, series inductances 434, 444, 454, and primary windings 431, 441, 451 of transformers 430, 440, 450 are arranged in a delta configuration that is connected to switching output terminals 416-418. Series inductances 434, 444, 454 may be implemented as discrete inductors, or they may consist of the leakage inductances of transformers 430, 440, 450. Transformer secondary windings 432, 442, 452 are floating and connected to inverter output terminals 461-466.

Figure 5:
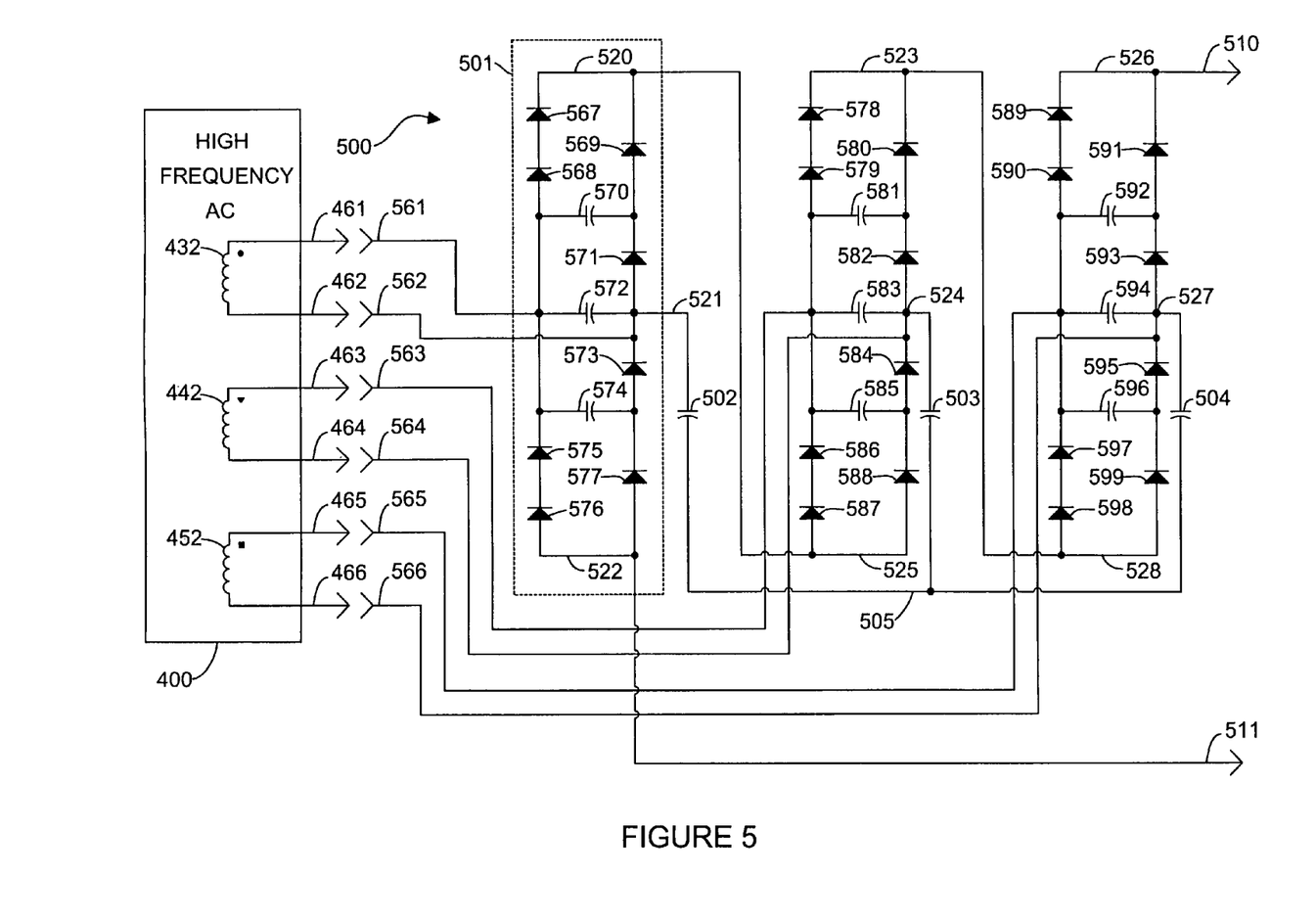
FIG. 5 illustrates a three-phase multiplying circuit that is preferably supplied by three floating windings, and having capacitors that couple common terminals of the three multipliers, in accordance with the present invention.
Figure 6:
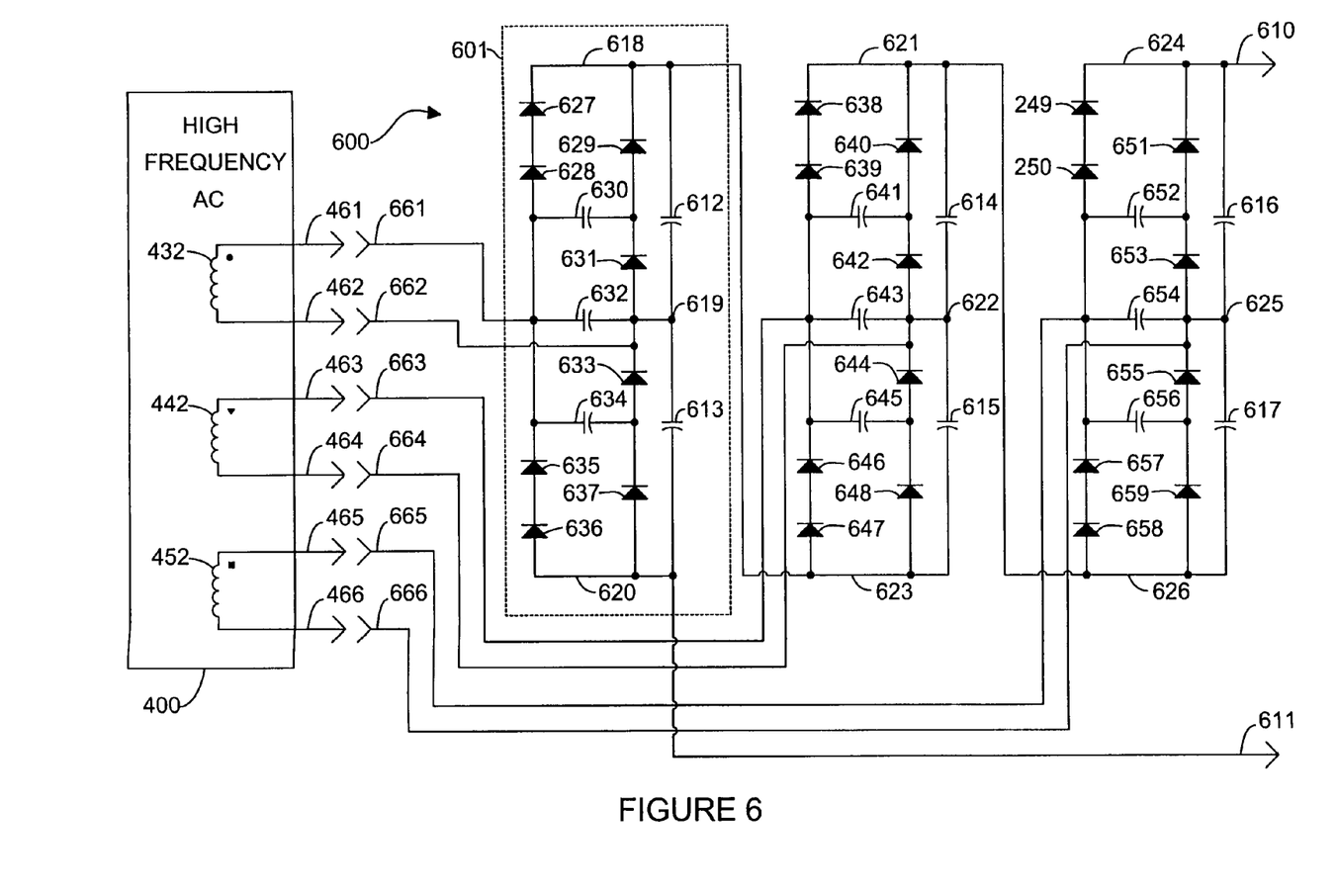
FIG. 6 illustrates a three-phase multiplying circuit that is preferably supplied by three floating windings, and having capacitors that couple common terminals of the three multipliers to the dc output terminals.

Although the voltages provided at switching output terminals 416-418 are square waves, the currents flowing through those terminals are nearly sinusoidal due to series-resonant interactions between series-connected capacitors 420-422 and series inductances 434, 444, 454, as well as the parallel-resonant interactions between series inductances 434, 444, 454 and the effective input capacitances of voltage multiplier circuits such as those shown in FIGS. 5 and 6.

Any known type of inverter may be employed with the power supply circuits of the present invention. The number of phases in the switching bridge may be increased, and they may also be reduced from three to two or even one, but reducing the number of phases increases the ripple in the output voltage of the power supply. The switching bridge could be chosen to be a multi-level bridge instead of the two-level bridge that is shown. The transformer primary windings and series capacitors could also be connected in a wye arrangement, as shown in FIG. 1.

Referring now to FIG. 5, there is shown a three-phase multiplying circuit 500 including three branch multiplier circuits that receive power from a conventional source of high-frequency ac power, such as inverter 400, through multiplier input terminals 561-566. The source of high-frequency ac power preferably has floating output windings such as windings 432, 442, 452 of inverter 400. Three-phase multiplying circuit 500 converts the ac input voltages applied to input terminals 561-566 to a dc output voltage that is developed between a positive output terminal 510 and a negative output terminal 511 for supplying a dc output current to an external load.

Three-phase multiplying circuit 500 includes three branch multiplier circuits connected in series. A branch multiplier circuit 501 is connected between a positive multiplier terminal 520 and a negative multiplier terminal 522, and includes a multiplier common terminal 521 that is connected to multiplier input terminal 562. The second branch multiplier circuit is connected between a positive multiplier terminal 523 and a negative multiplier terminal 525, and includes a multiplier common terminal 524 that is connected to multiplier input terminal 564. The third branch multiplier circuit is connected between a positive multiplier terminal 526 and a negative multiplier terminal 528, and includes a common multiplier terminal 527 that is connected to multiplier input terminal 566. Negative multiplier terminal 522 of the first branch multiplier is connected to negative output terminal 511, and positive multiplier terminal 526 of the third branch multiplier is connected to positive output terminal 510. It is also possible to connect the three branch multiplier circuits in parallel, with all of the positive multiplier terminals connected to the positive output terminal 510 and all of the negative multiplier terminals connected to the negative output terminal 511.

Each of the three branch multiplier circuits includes two voltage multiplier cells. For example, multiplier diodes 569, 571 and driving capacitor 570 form a voltage multiplier cell within branch multiplier 501. This cell produces a voltage between multiplier common terminal 521 and positive multiplier terminal 520 as driving capacitor 570 is charged and discharged by the ac voltage across parallel capacitor 572. Because the three branch multiplier circuits are connected in series, the three multiplier common terminals 521, 524, 527 cannot be directly tied together, but are instead coupled by three coupling capacitors 502-504 that are connected in a wye configuration at a central node 505. Alternatively, three coupling capacitors could be connected to the three multiplier common terminals in a delta configuration.

In each branch multiplier circuit, bypass rectifiers are connected between the multiplier input terminal that is not connected to a multiplier common terminal and the positive and negative terminals of that phase multiplier. For example, in the first branch multiplier, a bypass rectifier consisting of diodes 567, 568 is connected between multiplier input terminal 561 and positive multiplier terminal 520. Similarly, a bypass rectifier consisting of diodes 575, 576 is connected between multiplier input terminal 561 and negative multiplier terminal 522.

Additional multiplier cells may be added to each branch multiplier, with the multiplier cells and driver capacitors being connected in series as illustrated in FIG. 3, except that the intermediate terminals can only be connected together when the phase multipliers are connected in parallel. The intermediate terminals may also be coupled to each other by sets of coupling capacitors instead of being directly connected together.

Referring now to FIG. 6, there is shown a three-phase multiplying circuit 600 that receives power from a source of high-frequency ac power such as inverter 400 through multiplier input terminals 661-666. The source of high-frequency ac power preferably has floating output windings such as windings 432, 442, 452 of inverter 400. Three-phase multiplying circuit 600 converts the ac input voltages applied to input terminals 661-666 to a dc output voltage that is developed between a positive output terminal 610 and a negative output terminal 611 for supplying a dc output current to an external load.

Three-phase multiplying circuit 600 consists of three branch multiplier circuits connected in series. A branch multiplier circuit 601 is connected between a positive multiplier terminal 618 and a negative multiplier terminal 620, and includes a multiplier common terminal 619 that is connected to multiplier input terminal 662. The second branch multiplier circuit is connected between a positive multiplier terminal 621 and a negative multiplier terminal 623, and includes a multiplier common terminal 622 that is connected to multiplier input terminal 664. The third branch multiplier circuit is connected between a positive multiplier terminal 624 and a negative multiplier terminal 626, and has a multiplier common terminal 625 that is connected to multiplier input terminal 666. Negative multiplier terminal 620 of the first phase multiplier is connected to negative output terminal 611, and positive multiplier terminal 624 of the third branch multiplier is connected to positive output terminal 610. It is also possible to connect the three branch multiplier circuits in parallel, with all of the positive multiplier terminals connected to the positive output terminal and all of the negative multiplier terminals connected to the negative output terminal.

Each of the three branch multiplier circuits includes two voltage multiplier cells. For example, multiplier diodes 629, 631 and driving capacitor 630 form a voltage multiplier cell in the first phase multiplier. This cell produces a voltage between multiplier common terminal 619 and positive multiplier terminal 618 as driving capacitor 630 is charged and discharged by the ac voltage across parallel capacitor 632.

In each branch multiplier circuit, bypass rectifiers are connected between the multiplier input terminal that is not connected to a multiplier common terminal and the positive and negative terminals of that phase multiplier. For example, in branch multiplier circuit 601, a bypass rectifier consisting of diodes 627, 628 is connected between multiplier input terminal 661 and positive multiplier terminal 618. Similarly, a bypass rectifier consisting of diodes 635, 636 is connected between multiplier input terminal 661 and negative multiplier terminal 620.

The full-power output voltage range of three-phase multiplying circuit 600 may be extended by adding a shunt capacitor in parallel with each multiplier cell. For example, in the first branch multiplier, a shunt capacitor 612 is connected between multiplier common terminal 619 and positive multiplier terminal 618. Similarly, a shunt capacitor 616 is connected between multiplier common terminal 619 and negative multiplier terminal 620.

Additional multiplier cells may be added to each branch multiplier, with the multiplier cells and driver capacitors being connected in series as is shown in FIG. 3, except that the intermediate terminals can only be connected together when the branch multipliers are connected in parallel.

The smoothness of the previously-described "continuous automatic transmission effect" can be increased by staggering the values of the capacitors within a branch multiplier so that the alternating currents delivered by the source of high-frequency alternating current 400 exhibit less variation in magnitude due to changes in output voltage while a constant output power is maintained than would occur if all of the driving capacitors had the same value and all of the shunt capacitors had the same value. An example of staggered capacitor values is given in Table 1 below, which provides exemplary component values for a 400 watt power supply having a nominal input voltage 24 V and a full-power output voltage range of 750 V to 6.4 kV.

TABLE 1

Component values for a power supply based on FIGS. 4 and 6.

| 420 | 434 | 431 | 432 | 632 | 630 | 634 | 612 | 613 |
|---|---|---|---|---|---|---|---|---|
| 421 | 444 | 441 | 442 | 643 | 641 | 645 | 614 | 615 |
| 422 | 454 | 451 | 452 | 654 | 652 | 656 | 616 | 617 |
| 3.3 μF | 3 μH | 20 μH | 5.12 mH | 1.5 nF | 2.7 nF | 6.6 nF | 160 pF | 660 pF |

High frequency inverters 90 and 400 of the present invention could be modified by substituting alternators as sources of high frequency power in place of the switching bridges. The series inductances could be implemented with discrete inductors, or they could be represented by the leakage inductances of the alternator. In general, the series inductances in high frequency inverters 90 and 400, whether implemented discretely or by way of leakage inductances, could represent variable inductance values by utilizing any of many known prior art methods or structures for creating variable inductances.

Although specific structures and details of operation are described herein, changes and modifications may be made by those skilled in the art without departing from the spirit and the scope of this invention.

We claim:

1. A power supply for supplying a dc output current to a load through a pair of output terminals (238, 239; 387, 388; 510, 511; 610, 611), comprising:
   a source of high-frequency alternating current (90, 400); and
   a multiplying circuit (200, 300, 500, 600) having a plurality of multiplier input terminals coupled to the source of high-frequency alternating current, the multiplying circuit comprising one or more branch multiplier circuits (260, 390, 501, 601), each branch multiplier circuit comprising at least one multiplier input terminal (201, 311, 561, 661) and a plurality of bypass rectifiers (205, 320, 567, 627), one of the bypass rectifiers of each branch multiplier circuit being connected between each one of said pair of output terminals and a multiplier input terminal, each branch multiplier circuit comprising a plurality of multiplier cells (205), at least two of the multiplier cells being coupled to a multiplier common terminal (250, 384, 521, 619), each multiplier cell comprising at least two diodes and a driving capacitor, one of the bypass rectifiers of each branch multiplier circuit being connected between each one of said pair of output terminals and a multiplier input terminal;
   said multiplier cells providing said dc output current when said dc output current is below a conduction threshold level, said bypass rectifiers providing a portion of said dc output current when said dc output current is equal to or greater than said conduction threshold level.

2. A power supply as in claim 1, wherein said source of high-frequency alternating current comprises an inverter circuit coupled to a source of dc power.

3. A power supply as in claim 1, wherein said one or more branch multiplier circuits comprises a plurality of branch multiplier circuits connected to each other at a multiplier common terminal (250).

4. A power supply as in claim 1, wherein each branch multiplier circuit comprises a plurality of multiplier cells connected in a series of stages between said pair of output terminals;
   said power supply further comprising intermediate terminals (383, 385) formed at junctions between successive stages of said multiplier cells, the intermediate terminals of corresponding stages of said branch multiplier circuits being coupled to each other.

5. A power supply as in claim 1, further comprising:
   a plurality of multiplier common terminals (521, 524, 527); and
   at least one capacitor (502, 503, 504) coupling said plurality of multiplier common terminals to each other.

6. A power supply as in claim 1, further comprising:
   a plurality of multiplier common terminals (619, 622, 625); and
   a shunt capacitor (612-617) coupling each one of said plurality of multiplier common terminals to each one of said output terminals.

7. A power supply as in claim 6, wherein:
each of said driving capacitors and each of said shunt capacitors (612-617) within each of said branch multiplier circuits have staggered capacitance values chosen such that alternating currents delivered by said source of high-frequency alternating current exhibit a reduced variation in magnitude due to changes in an output voltage while maintaining a constant output power.

* * * * *